(12) United States Patent
Cattermole

(10) Patent No.: US 10,423,441 B2
(45) Date of Patent: Sep. 24, 2019

(54) COMPUTER-IMPLEMENTED METHODS AND SYSTEMS OF AUTOMATICALLY GENERATING AND STORING TASKS FOR MESSAGING APPLICATIONS

(71) Applicant: James Cattermole, Hawthorn (AU)

(72) Inventor: James Cattermole, Hawthorn (AU)

(73) Assignee: James Cattermole (AU)

( * ) Notice: Subject to any disclaimer, the term of this patent is extended or adjusted under 35 U.S.C. 154(b) by 60 days.

(21) Appl. No.: 15/636,149

(22) Filed: Jun. 28, 2017

(65) Prior Publication Data

US 2018/0067761 A1 Mar. 8, 2018

Related U.S. Application Data

(60) Provisional application No. 62/384,125, filed on Sep. 6, 2016.

(51) Int. Cl.
*G06F 9/46* (2006.01)
*H04L 12/58* (2006.01)

(52) U.S. Cl.
CPC .............. *G06F 9/46* (2013.01); *H04L 51/08* (2013.01); *H04L 51/18* (2013.01); *H04L 51/22* (2013.01)

(58) Field of Classification Search
CPC ........................................................ G06F 9/46
See application file for complete search history.

(56) References Cited

U.S. PATENT DOCUMENTS

| 5,548,506 | A | 8/1996 | Srinivasan |
| 5,995,951 | A | 11/1999 | Ferguson |
| 6,810,383 | B1 | 10/2004 | Loveland |
| 8,837,717 | B1 * | 9/2014 | Thorpe ................ H04L 51/18 380/44 |
| 2004/0186762 | A1 | 9/2004 | Beaven et al. |
| 2006/0161621 | A1 | 7/2006 | Rosenberg |
| 2007/0083423 | A1 | 4/2007 | Delbridge |

(Continued)

FOREIGN PATENT DOCUMENTS

| WO | 2000/014618 A2 | 3/2000 |
| WO | 2013/116153 A1 | 8/2013 |

(Continued)

OTHER PUBLICATIONS

Accessing Gmail from Python, Aug. 6, 2015 (Year: 2015).*

*Primary Examiner* — Charlie Sun
(74) *Attorney, Agent, or Firm* — Procopio, Cory, Hargreaves & Savitch LLP

(57) ABSTRACT

Embodiments generally relate to a computer-implemented method and system of automatically generating a task on a first messaging application at a first client device associated with a first user. The method includes: parsing, by the first client device, message content from an active field on the first messaging application of the first client device to identify at least one predefined character in the message content; and receiving, in relation to the message content, a selection of a user name associated with a second user. Task metadata may be automatically generated based on at least the first user, second user and a portion of the message content. The task metadata may then be attached, by the first client device, to the message content. First task data based on the task metadata may then be automatically generated at the first client device.

11 Claims, 9 Drawing Sheets

(56) References Cited

U.S. PATENT DOCUMENTS

| | | |
|---|---|---|
| 2007/0174387 A1 | 7/2007 | Jania et al. |
| 2008/0288914 A1 | 11/2008 | Schmitter |
| 2011/0154338 A1 | 6/2011 | Ramanathaiah et al. |
| 2014/0172986 A1 | 6/2014 | Kumar et al. |
| 2014/0278343 A1 | 9/2014 | Tran |
| 2015/0112749 A1 | 4/2015 | Erdal |

FOREIGN PATENT DOCUMENTS

| | | |
|---|---|---|
| WO | 2013/122630 A1 | 8/2013 |
| WO | 2016/007286 A1 | 1/2016 |

\* cited by examiner

COMPUTER-IMPLEMENTED METHODS AND SYSTEMS OF AUTOMATICALLY GENERATING AND STORING TASKS FOR MESSAGING APPLICATIONS

TECHNICAL FIELD

The present disclosure relates to methods and systems of generating and storing a task at a messaging application of a client device.

BACKGROUND

Messaging applications such as email clients are often used in everyday situations. In particular, workplaces commonly use email client applications such as Microsoft Outlook. In such environments, emails are commonly used to delegate, as well as keep track of, tasks. Accordingly, users of messaging applications often use their email inbox as a task list.

However, a shortcoming of this is that tasks and messages are not categorised nor separated. This is visually unappealing to the users of the email client and unnecessarily clutters the display of the messaging application. It is also inefficient for the workplace.

Any discussion of documents, acts, materials, devices, articles or the like which have been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a computer-implemented method of automatically generating a task on a first messaging application at a first client device associated with a first user, the method comprising: parsing, by the first client device, message content from an active field on the first messaging application of the first client device to identify at least one predefined character in the message content; receiving, in relation to the message content, a selection of a user name associated with a second user; automatically generating task metadata based on at least the first user, second user and a portion of the message content; attaching, by the first client device, the task metadata to the message content; sending, from the first client device to the second a second client device associated with the second user, a message comprising the message content; and automatically generating, at the first client device, first task data based on the task metadata.

The method may further comprise storing, in relation to the first messaging application, the first task data at a location accessible by the first messaging application.

The method may further comprise displaying, at a display portion on the first client device, a task based on the first task data. In the method, the selection of the user name may be based on a list of names. In the method, receiving the selection of the user name may comprise the first user selecting the user name via the first client device.

In the method, based on sensing a mouse operation near the task on the display portion of the first client device, content associated with the task based on the first task data may be displayed.

The message may be an email. The task metadata may be attached to a header of the email.

In the method, the predefined character may comprise "@".

Some embodiments relate to a computer-implemented method of automatically storing a task on a second messaging application at a second client device associated with a second user according to the method described above, further comprising: receiving, at the second client device, the message comprising the message content; detecting, in relation to the message content, the task metadata attached to the message content; identifying, by the second client device, second user data in the task metadata, wherein the second user data is associated with the second user; based on the identifying of the second user data, automatically generating second task data based on the task metadata; and storing, in relation to the second messaging application, the second task data at a location accessible by the second messaging application.

The method may further comprise displaying, at a display portion on the second client device, a task based on the second task data.

Some embodiments relate to a computer software program comprising machine-readable instructions to cause a processing device to implement the method described above.

Some embodiments relate to a computer-implemented method of automatically storing a task on a second messaging application at a second client device associated with a second user, the method comprising: receiving, at the second client device, a message comprising message content from a first client device; detecting, in relation to the message content, task metadata attached to the message content; identifying, by the second client device, second user data in the task metadata, wherein the second user data is associated with the second user; based on the identifying of the second user data, automatically generating second task data based on the task metadata; and storing, in relation to the second messaging application, the second task data at a location accessible by the second messaging application.

The method may further comprise displaying, at a display portion on the second device, a task based on the second task data.

In the method, before receiving, at the second client device, a message comprising message content from a first client device, the method may comprise parsing, by the first client device, message content from an active field on the first messaging application of the first client device to identify at least one predefined character in the message content; receiving, in relation to the message content, a selection of a user name associated with a second user; automatically generating task metadata based on at least the first user, second user and a portion of the message content; attaching, by the first client device, the task metadata to the message content; sending, from the first client device to a second client device associated with the second user, a message comprising at least the message content; and automatically generating, at the first client device, first task data based on the task metadata.

The method may further comprise storing, in relation to the first messaging application, the first task data at a location accessible by the first messaging application.

The method may further comprise displaying, at a display portion on the first client device, a task based on the first task data.

In the method, the selection of the user name may be based on a list of names. In the method, receiving the selection of the user name comprises the first user selecting the user name via the first client device.

In the method, based on sensing a mouse operation near the task on the display portion of the second client device, content associated with the task based on the second task data is displayed.

The message may be an email. The task metadata is attached to a header of the email.

In the method, the predefined character may comprise "@".

Some embodiments relate to a computer software program comprising machine-readable instructions to cause a processing device to implement the method described above.

Some embodiments relate to a computer system for automatically generating and storing a task, the system comprising a first client device associated with a first user and a second client device associated with a second user, the first device having a first messaging application and the second device having a second messaging application; the first client device being configured to: parse message content from an active field on the first messaging application of the first client device to identify at least one predefined character in the message content; receive, in relation to the message content, a selection of a user name associated with a second user; automatically generate task metadata based on at least the first user, second user and a portion of the message content; attach the task metadata to the message content; send, to the second client device, a message comprising the message content; and automatically generate first task data based on the task metadata; the second client device being configured to: receive the message comprising message content from the first client device; detect, in relation to the message content, task metadata attached to the message content; identify second user data in the task metadata, wherein the second user data is associated with the second user; based on the identifying of the second user data, automatically generate second task data based on the task metadata; and store, in relation to the second messaging application on the second client device, the second task data at a location accessible by the second messaging application.

BRIEF DESCRIPTION OF DRAWINGS

Examples of the present disclosure will be described with reference to.

DESCRIPTION OF EMBODIMENTS

Overview of the System

A method and system of automatically generating a task on a first messaging application at a first client device associated with a first user will now be described.

Figure 1:
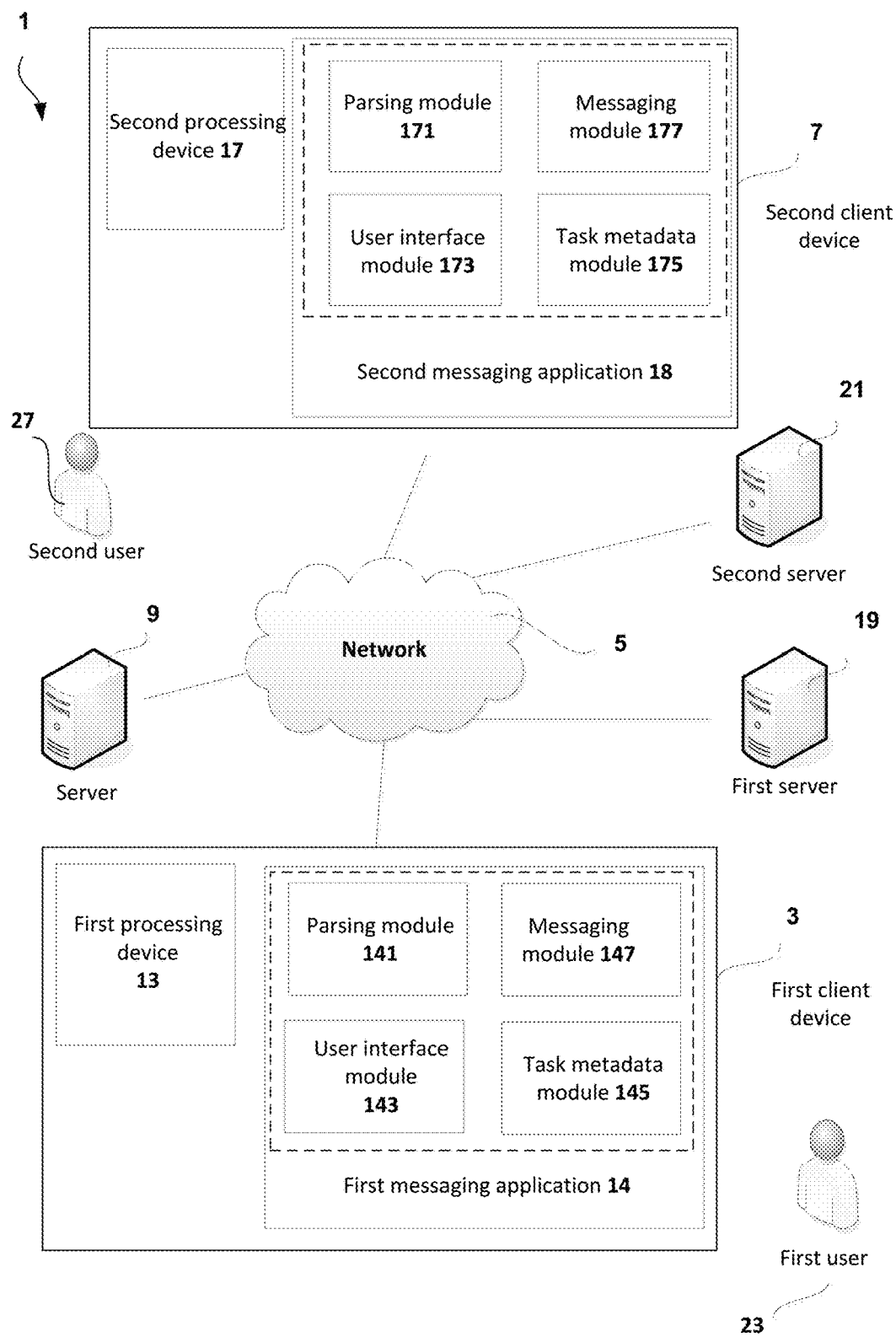
FIG. 1 illustrates a schematic diagram of an example system for automatically generating and storing a task at a first client device or a second client device.

FIG. 1 illustrates a system 1 that includes a first client device 3 that is in communication with, over a communications network 5, a second client device 7. The first client device 3 has an associated first processing device 13 and the second client device 7 has an associated second processing device 17. Examples of the first and second client devices 3, 7 include a mobile communication device, computer, tablet computer, computer server, etc. The first client device 3 may be in communication with a first server 19 and the second client device 7 may be in communication with a second server 21. In another example, the first client device 3 and second client device 7 are in communication with a server 9 over the communications network 5.

Figure 2:
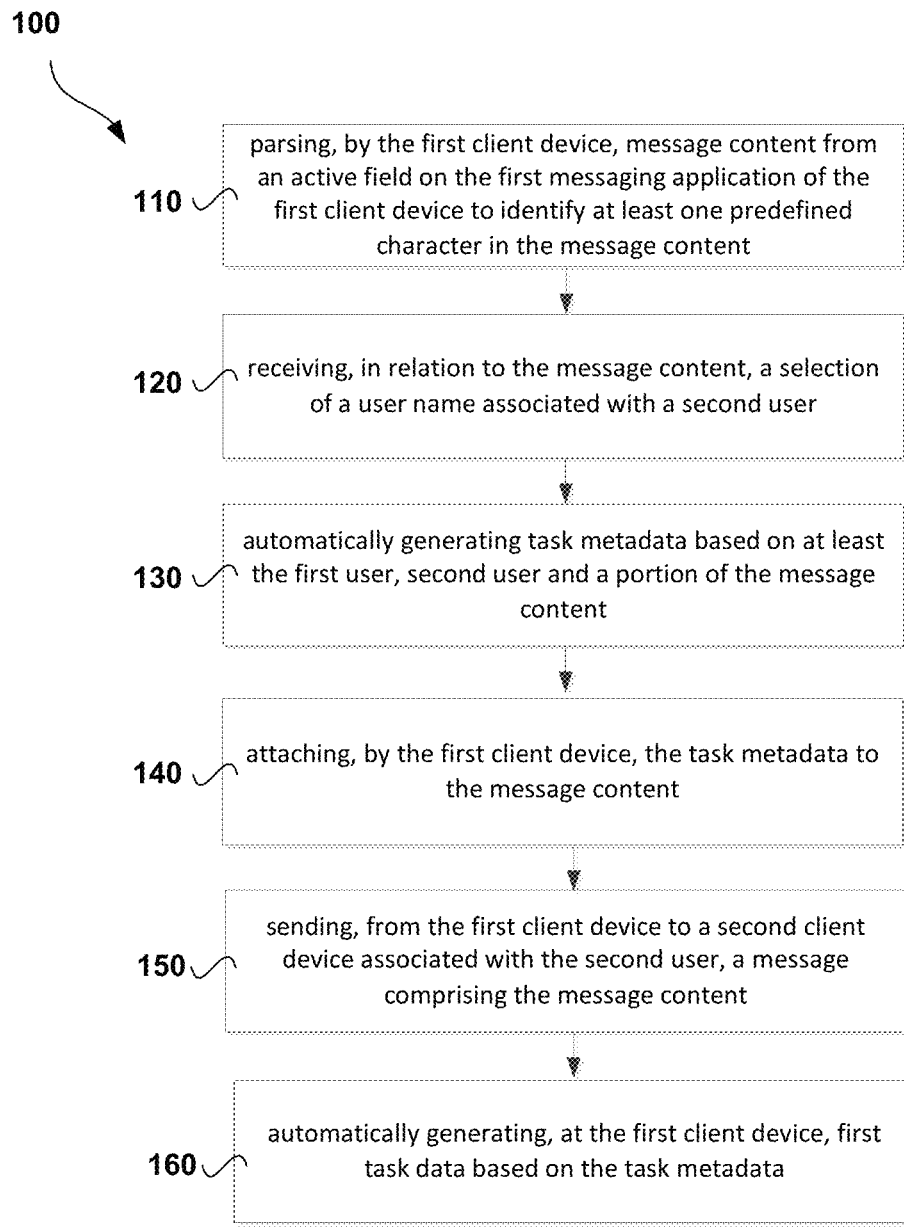
FIG. 2 illustrates a flow chart of automatically generating a task on a first messaging application at a first client device.
Figure 6:
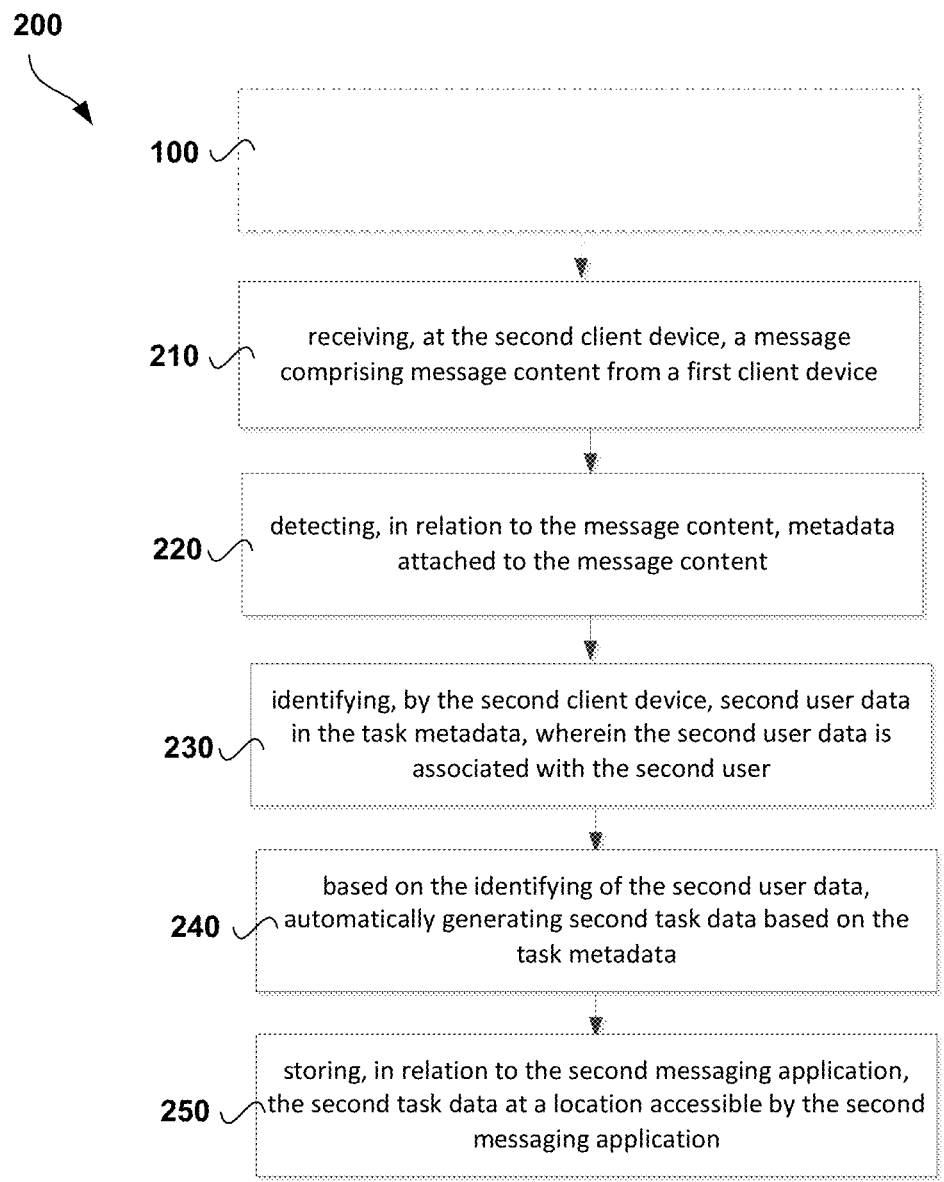
FIG. 6 illustrates a flow chart of automatically storing a task on a second messaging application at a second client device.

The first client device 3 is associated with a first user 23 and the second client device 7 is associated with a second user 27. In one example, the first client device 3 performs the method 100, 200 as illustrated by FIG. 2 and FIG. 6 respectively. In another example, the second client device 7 may perform the method 100, 200. While the exemplary embodiments below may refer to the first client device 3 or second client device 7 as performing the methods, it is to be understood the disclosure may also be adapted or modified to be performed by other client devices.

The first messaging application 14 and the second messaging application 18 may be a software embodiment. In one example, the software embodiment of the first messaging application 14 and the second messaging application 18 may comprise software modules 141, 143, 145, 147, 171, 173, 175, 177. The software modules may contain instructions that are executable by the first processing device 13 of the first client device 3 or the second processing device 17 of the second client device 7.

The method 100 as illustrated by FIG. 2 includes parsing 110 message content from an active field on the first messaging application 14 of the first client device 3 to identify at least one predefined character in the message content. The first messaging application 14 may be an email client. The method 100 also includes receiving 120, in relation to the message content, a selection of a user name associated with a second user 7. In one example, the user name is selected by the first user 23 at the first client device 3.

The method 100 also includes automatically generating 130 task metadata based on at least the first user 3, second user 7 and a portion of the message content. The method 100 further includes attaching 140, by the first client device 3, the task metadata to the message content. In one example, the task metadata is attached to a header of an email.

The method 100 further includes sending 150, from the first client device 3 to the second client device 7 associated with the second user 27, a message comprising the message content. The message may be an email. The method 100 also includes automatically generating 160, at the first client device 3, the first task data based on the task metadata.

A method and system of automatically storing a task on a second messaging application at a second client device associated with a second user will now be described.

The method 200 as illustrated by FIG. 6 automatically stores a task on a second messaging application 18 at a second client device 7 associated with the second user 27 and is performed after the method 100 described above. This is shown as the optional step 100 in FIG. 6. The method 200 includes receiving 210, at the second client device, a message comprising message content from a first client device. As described above, in one example the message may be an email.

The method 200 further includes detecting 220, in relation to the message content, task metadata attached to the message content. In one example, the second client device 7 may detect the task metadata from a header of the email. The method 200 also includes identifying 230, by the second client device 7, second user data in the task metadata, wherein the second user data is associated with the second user.

Based on the identifying 230 of the second user data, the method 200 further includes automatically generating second task data based on the task metadata.

The method 200 further includes storing 250, in relation to the second messaging application 18, the second task data at a location accessible by the second messaging application 18. In one example, the second task data is stored at the second client device 7.

A detailed example of the methods 100, 200 will now be described.

Method 100

Parsing Message Content from an Active Field on the First Messaging Application 110

As described above the method 100 includes parsing 110, by the first client device 3, message content from an active field on the first messaging application 14 of the first client device 3 to identify at least one predefined character in the message content. In one example, the first messaging application 14 may comprise a parsing module 141 that is configured to parse 110 the message content from the active field on the first messaging application 14.

The first messaging application 14 may be an email client and the message content may be in relation to an email. The first messaging application 14 may alternatively be an instant messaging application or social media application such as WhatsApp, MSN messenger, Yammer, Facebook messenger, Instagram, Yahoo messenger, Kik, Skype, BBM or AOL instant messenger.

In one example, the first messaging application 14 may be Microsoft Outlook or Gmail. In this way, the active field on the first messaging application 14 is a message window that appears on a display portion of the first client device 3 when the first user 23 composes the email.

Figure 3:
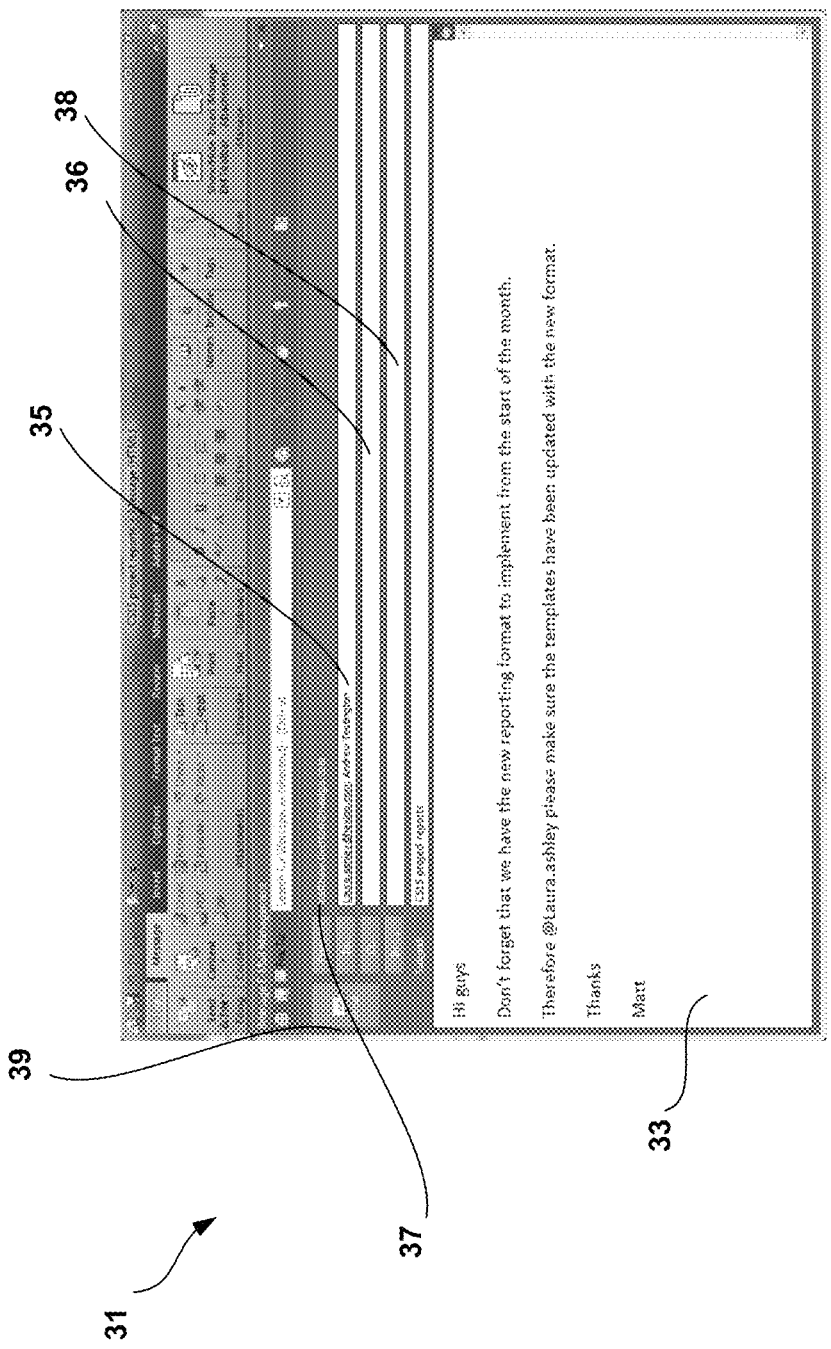
FIG. 3 illustrates an example of a message window provided by a messaging application.

An example of a message window 31 provided by an email client is provided in FIG. 3. In this example, the message window 31 comprises an active input field 33 where the first user 23 composes the email. In this way, the parsing module 141 of the first messaging application on the first client device 3 parses 110 the message content in the active field 33 of the message window 31 by parsing all characters in the active field 33 to identify the at least one predefined character in the email.

In one example, the at least one predefined character comprises the "@" symbol. In another example, the predefined character comprises another symbol such as "&", "#", "+", "!" or "*". Thus, the predefined character may comprise a sequence of one or more characters. In this way, the predefined character may comprise any combination or permutation of the abovementioned symbols, for instance "@#", "+#", "++", "!#", or other single symbols or ASCII characters or combinations of symbols or ASCII characters. It will be appreciated that there are numerous combinations and permutations for the predefined character sequence.

It is to be further appreciated that the predefined character sequence may be configurable from within the messaging application or may be varied from time to time via software updates of the messaging application. In one example, the predefined character sequence changes depending on the operating environment of the messaging application. In yet another example, the predefined character sequences changes depending on the message content in the active field 33.

Receiving a Selection of a User Name Associated with a Second User 120

As also described above the method further includes receiving 120, in relation to the message content, a selection of a user name associated with a second user 27. In one example, receiving 120 a selection of a user name may be detected by a user interface module 143 of the first messaging application 14. Receiving 120 a selection of a user name may comprise the first user 23 selecting the user name via the first client device 3 and the user interface module 143 detecting the selection. In one example, the first user 23 may select the user name from a list of names. In a further example, the list of names may be displayed by the user interface module 143 on a display portion on the first client device 3.

The list of names is based on stored or received name data. In one example, the name data (or a link thereto) may be stored at a location accessible by the first messaging application 14. The location may comprise a storage location in the local memory of, or associated with the first client device 3. In another example, the name data may be stored at the server 19 that is in communication with the first messaging application 14 and the first client device 3. In a further example, the name data may be stored at the server 9 or in a cloud storage associated with the communications network 5. In this way, the user interface module 143 may communicate with the server 19, 9 or the cloud storage to retrieve the name data. The user interface module 143 may then display the list of names based on the retrieved name data.

In one example, the name data is generated by the first messaging application 14. In this way, the messaging application 14 parses the email addresses associated with the first messaging application 14 to generate the name data. The messaging application 14 may parse the email addresses associated with or populated into the addressee or recipient fields, such as the "To" field 35 as illustrated in FIG. 3. The messaging application 14 may also parse the email addresses associated with the "Cc" field 36 and the "Bcc" field 38 as also illustrated in FIG. 3. In this way, the name data that is generated by the first messaging application 14 is then used by the user interface module 143 to display the list of names on the display portion of the first client device 3.

In yet a further example, the list of names may be displayed by the user interface module 143 on a dynamic window of the display portion of the first client device 3. In this way, as the first user 23 composes the email, the list of names may appear in a separate window within the window 31.

The first user 23 selects the user name via an input device associated with the first client device 3. In one example, the input device may be a mouse. In another example, the input device may be a keyboard. In yet another example, the first user 23 may select the user name via a touch screen on the first client device 3.

The selection of the user name by the first user 23 may then be detected by the user interface module 143 of the first messaging application 14.

Automatically Generating Task Metadata 130

The method 100 also includes automatically generating 130 task metadata based on at least the first user 23, second user 27 and a portion of the message content. In one example, the first messaging application 14 may comprise a task metadata module 145 that automatically generates 130 the task metadata. The task metadata module 145 may automatically generate the task metadata as a result of the parsing module 141 identifying the at least one predefined character in the message content. The automatic generation of the task metadata by the task metadata module 145 may further be based on the detection by the user interface module 143 of the user name associated with the second user 7.

Task metadata may comprise information in relation to the first user 23, second user 27 and the message content. In one example, the task metadata may comprise an indication that the predefined character has been detected. That is, an indication that the predefined character has been detected by the parsing module 141 as described above. In a further example, the task metadata may comprise identifying information in relation to the first user 23 and the second user 27, such as an email address or a name associated with the first user 23 or the second user 27. In one example, the task metadata comprises the email addresses or names 35 in the "To" field as illustrated in FIG. 3. In a further example, the task metadata comprises the name associated with the first user 23 or the email address 37 associated with the first user 23.

The task metadata may further comprise a portion of the message content. In one example, the task metadata comprises a portion of the text of the email in the messaging application. The task metadata module 145 may select the portion of the text based on the detection of the predefined character. In one example, the text surrounding the predefined character that is between a delimiter may be selected. The delimiter may comprise a defined number of spaces, a tab space or a character. In another example, the task metadata module 145 may select the entire message content. In this way, the task metadata comprises the text illustrated in the message window 31.

Attaching the Task Metadata to the Message Content 140

The method 100 further includes attaching 140, by the first client device 3, the task metadata to the message content. In one example, the first messaging application 14 may comprise a messaging module 147 that is configured to attach 140 the task metadata to the message content. In this way, the messaging module 147 attaches 140 the task metadata to the message content as a result of the task metadata module 145 generating the task metadata.

Figure 4:
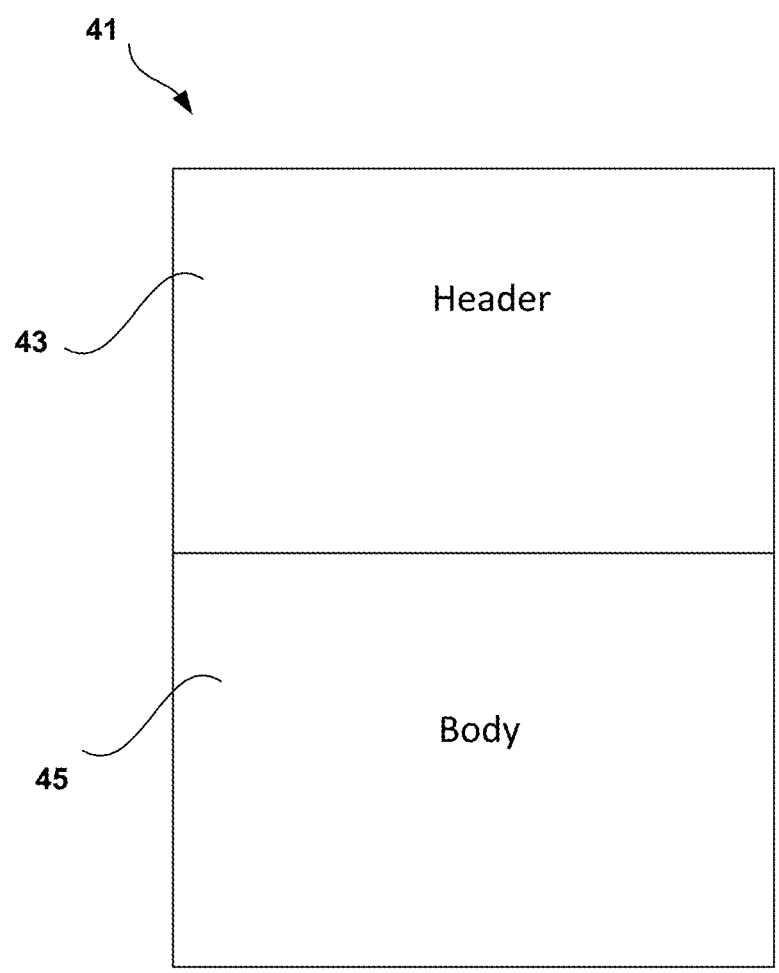
FIG. 4 illustrates an example of a structure of an email.

As described above, in one example the message may be an email. In this way, the task metadata is attached to the email by the messaging module 147. FIG. 4 illustrates an example of a structure 41 of an email. The structure 41 comprises a header 43 and a body 45. The header 43 of the email may comprise routing information of the message such as details of the first user 23, second user 27, date of the email, subject of the email, and any other recipients of the email. The header may further comprise time stamps and any other information in relation to the first messaging application 14 and the email.

In one example, the task metadata may be attached to the header 43 of the email. In this way, the messaging module 147 of the first messaging application 14 amends the header 43 of the email to include the contents of the task metadata.

Sending a Message Comprising the Message Content 150

As also described above the method 100 includes sending 150, from the first client device 3 to a second client device 7 associated with the second user 27, a message comprising the message content. In one example, the messaging module 147 may be configured to send 150 the message from the first client device 3 to the second client device 7 as a result of the messaging module 147 attaching 140 the task metadata to the message content. In one example, sending 150 the message comprises sending the email from the first user 23 to the second user 27.

The sending 150 of the message may be based on an action by the first user 23 at the first client device 3. The messaging module 147 of the first messaging application 14 may be configured to detect the action by the first user 23. In one example, the action may be in relation to selecting or pressing a button 39 on the window 31 of the messaging application as illustrated in FIG. 3. The first user 23 may perform the action via an input device. The input device may be a mouse, keyboard or a touch screen of the first client device.

Automatically Generating First Task Data Based on the Task Metadata 160

The method 100 further includes automatically generating 160, at the first client device 3, first task data based on the task metadata. The messaging module 147 may generate 160 the first task data based on the task metadata that the task metadata module 145 generated. In one example, the first task data includes the contents of the task metadata. This may comprise information in relation to the first user 23, second user 27 and the message content.

Figure 5:
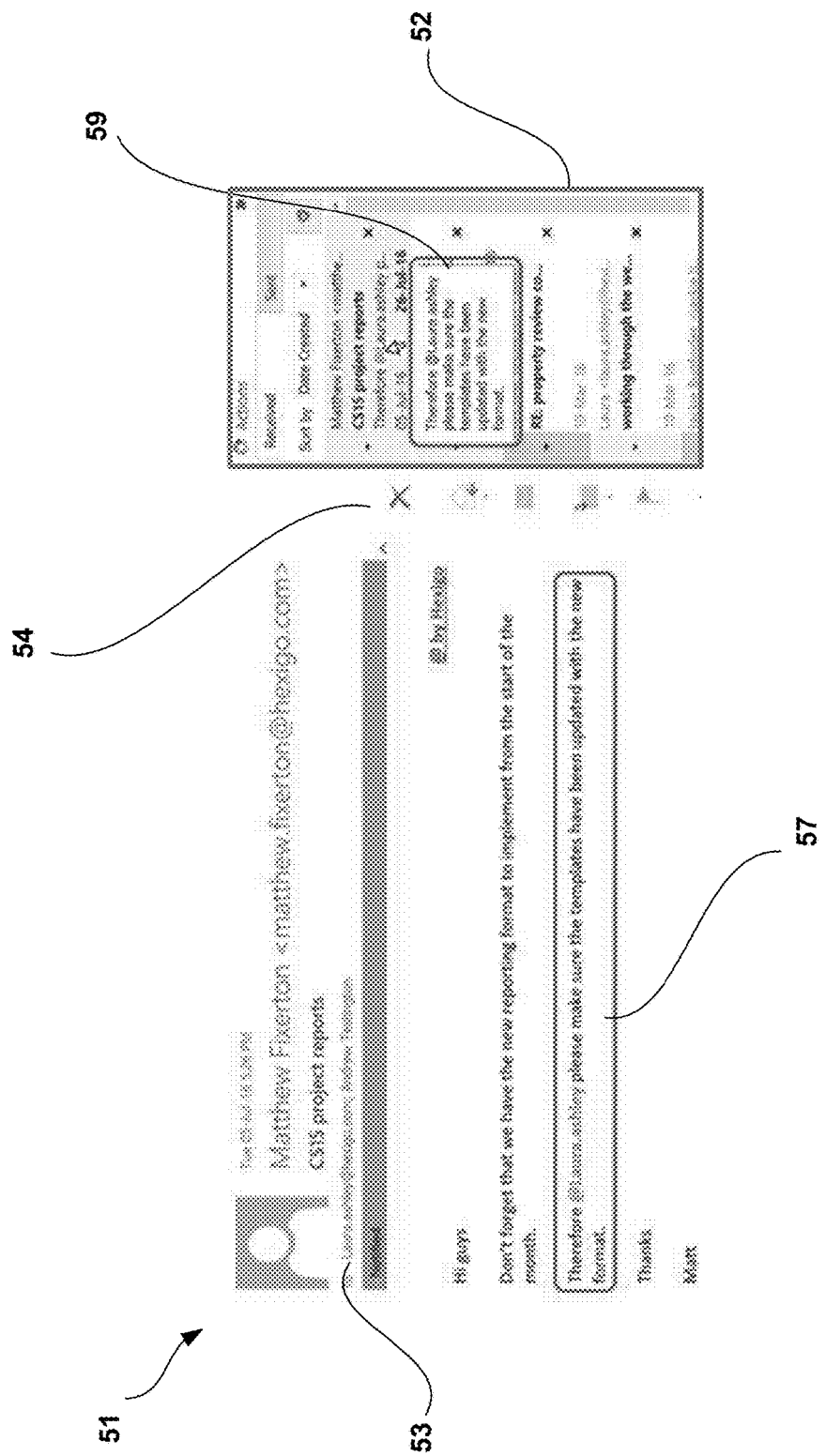
FIG. 5 illustrates an example of message window provided by a messaging application.

In another example, the method 100 may further comprise displaying, at a display portion on the first client device 3, a task based on the first task data. The task may be displayed by the user interface module 143. FIG. 5 illustrates an example of the task 59 that may be displayed at a window 51 on the first client device 3 as part of a task list 52. In this example, the task 59 in the task list 52 is generated by the first messaging application 14 of the first client device 3 and the task 59 includes a portion of the text 57 of the email. The task list 52 illustrated in FIG. 5 may also comprise other tasks that the first user 23 has generated by the abovementioned modules of the first messaging application 14. The task list 52 may further comprise tasks that the first user 23 has received from other users of a similar messaging application.

In a further example, the window 51 that is displayed on the first client device 3 comprises at least one icon 54 that performs a predefined function. The icon may be in relation to the actions of: deleting, replying, forwarding, creating a new email or task, saving, filing at a location accessible by the first messaging application 14, or flagging. In this way, the first user 23 indicates the desired function by selecting text 57 from the window 51 and then selecting the appropriate icon 54. The selection of the text 57 or the icon 54 may be via an input device such as a mouse, keyboard or touch screen on the first client device 3.

The first task data that is generated by the messaging module 147 may be stored at a location accessible by the first messaging application 14. The messaging module 147 may store the first task data. In one example, the first task data may be stored at the first client device 3. In this way, the first task data (or a link thereto) may be stored in a folder associated with the first messaging application 14, such as the 'Sent' folder. In another example, the first task data may be stored in a folder in the local memory of, or associated with the first client device 3. In another example, the first task data may be stored at the server 19 that is associated with the first messaging application 14. In yet another example, the second task data may be stored at server 9. In yet another example, the first task data may be stored in a cloud storage associated with the communications network 5.

The first messaging application 14 may access the first server 19 or server 9 to retrieve the first task data for display by the user interface module 143. In one example, the first messaging application 14 may send a request to the first server 19 or server 9 to retrieve the first task data. The first messaging application 14 may send the request to retrieve the first task data as a result of a request from the first user 23 or another user of a messaging application. The first messaging application 14 may also send the request to retrieve the first task data as a result of the messaging module 147 automatically generating 160 the task data.

Method 200

Receiving a Message Comprising Message Content 210

As described above, the method 200 includes receiving 210, at the second client device 7, a message comprising message content from a first client device 3. In one example, the first second messaging application 18 comprises a messaging module 177 that is configured to receive the message from the first client device 3. The second messaging application 18 on the second device 7 may be an email client and the message content may be in relation to an email. In a further example, the second messaging application 18 may be Microsoft Outlook or Gmail. The second messaging application 18 may alternatively be an instant messaging application or social media application, for example. The second messaging application 18 is preferably another copy of the first messaging application 14 (or a compatible version of that messaging application) that is operating on a different computing device.

Detecting Task Metadata Attached to the Message Content 220

As described above the method 200 further includes detecting 220, in relation to the message content, task metadata attached to the message content. In one example, the second messaging application 18 may comprise a task metadata module 175 that detects 220 the task metadata attached to the message content. The task metadata may be automatically generated in accordance with the method 100 described above. That is, the task metadata is automatically generated as a result of the parsing module 141 of the first client device 3 identifying the at least one predefined character in the message content.

As described above, in one example the message content of the message received by the second messaging application 18 may be in relation to an email with the structure 41 as illustrated in FIG. 4. In a further example, the task metadata may be attached to the header 43 of the email structure 41. In this way, the second client device 7 detects the task metadata from the contents of the header 43. This may comprise parsing the contents of the header 43 by a parsing module 171 of the second client device 7 for an indication that the task metadata comprises information in relation to the first user 23, second user 27 and the message content. In a further example, the parsing module 171 of the second client device 7 parses the contents of the header 43 for an indication that the predefined character was detected in the message content.

Identifying Second User Data in the Task Metadata 230

The method 200 further includes identifying 230, by the second client device 7, second user data in the task metadata attached to the message, wherein the second user data is associated with the second user 7. The parsing module 171 of the second messaging application 18 may identify 230 the second user data in the task metadata of the message. In one example, the message is an email with the structure illustrated in FIG. 4. In this way, the parsing module 171 detects the second user data from the task metadata attached to the header 43 of the email.

As described above, the task metadata may comprise information in relation to the second user 27. In one example, the task metadata may comprise identifying information in relation to the second user 27, such as an email address or a name associated with the second user 27. In one example, the task metadata may comprise the email addresses 53 in the "To" field as illustrated in FIG. 5. The task metadata may also comprise email addresses in another recipient field such as a "Cc" field 36 or "Bcc" field 38.

In this way, the second client device 7 identifies the identifying information in relation to the second user 27 from the task metadata.

Automatically Generating Second Task Data 240

Based on the identifying 230 of the second user data by the parsing module 171 of the second messaging application 18, the method 200 also includes automatically generating second task data based on the task metadata. The second messaging application 18 may comprise a messaging module 177 that automatically generates 240 the second task data based on the task metadata. That is, the messaging module 177 automatically generates 240 the second task data based on the task metadata identified by the task metadata module 175 as described above. In one example, the second task data may specify the contents of the task metadata. This may comprise information in relation to the first user 23, second user 27 and the message content.

Figure 7:
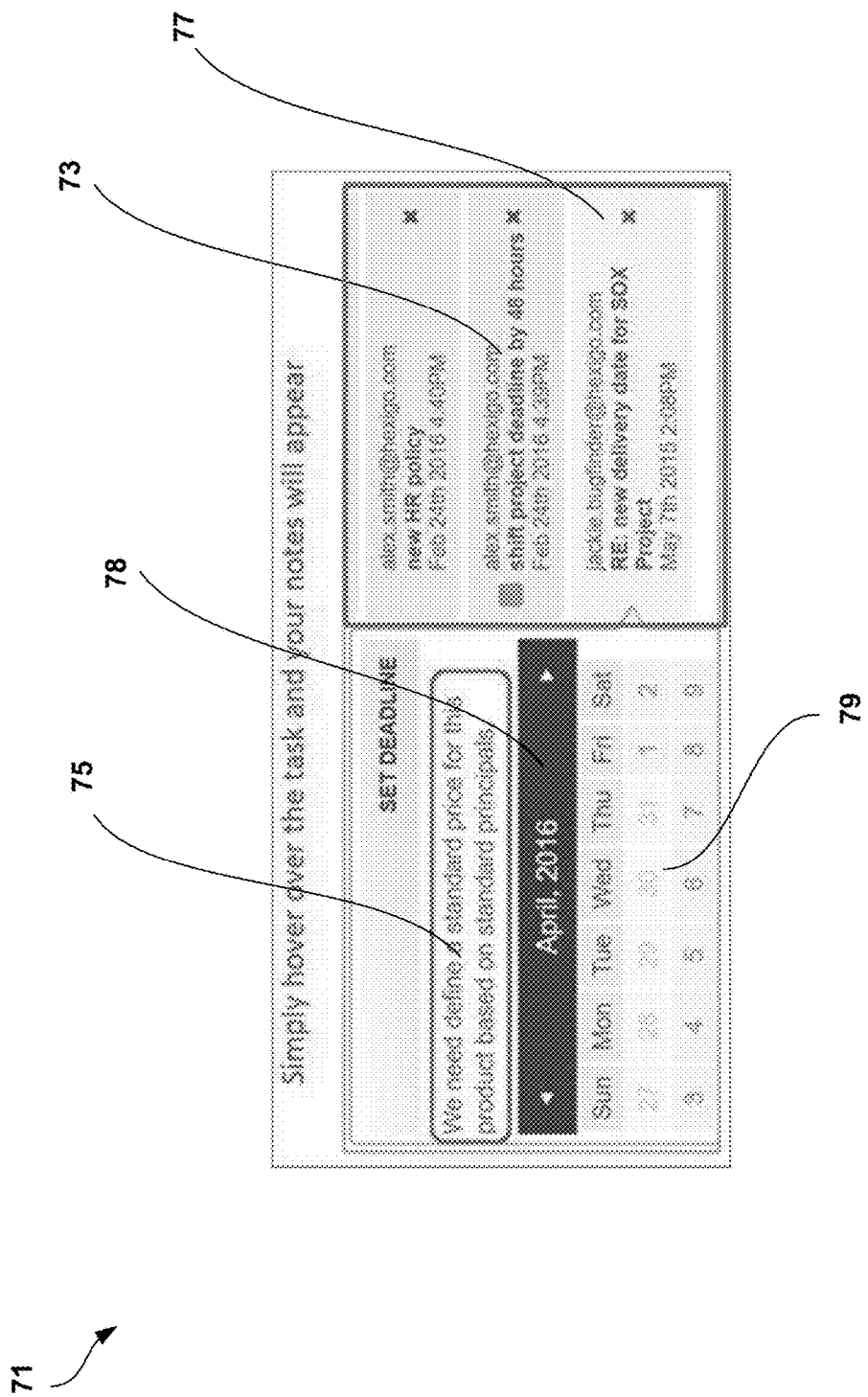
FIG. 7 illustrates an example of a task displayed at a client device.

In a further example, the method 200 comprises displaying, at a display portion on the second client device 7, a task based on the second task data. The task may be displayed by a user interface module 173 of the second messaging application 18. FIG. 7 illustrates an example of the task 73 displayed at a display portion 71 on the second client device 7. In one example, the display portion 71 is generated by an email client application.

In FIG. 7 the task 73 is displayed within a task list 77. In this example, the task 73 in the task list 77 is generated by the second messaging application 18 of the second client device 7. The task list 77 may also comprise other tasks that the second user 27 has received from other users of a similar messaging application.

Storing the Second Task Data 250

The method 200 also includes storing 250, in relation to the second messaging application 18, the second task data at a location accessible by the second messaging application 18. In one example, the messaging module 177 of the second messaging application 18 stores 250 the second task data. In another example, the second messaging application 18 may comprise a storing module that stores 250 the second task data. In one example, the second task data (or a link thereto) may be stored at the second client device 7. In this way, the second task data may be stored in a folder associated with the second messaging application 18. In another example, the second task data may be stored in a folder in the local memory of, or associated with, the second client device 7. In another example, the second task data may be stored at a second server 21 that is associated with the second messaging application 18. In yet another example, the second task data may be stored at a central server 9. In yet another example, the second task data may be stored in a cloud storage associated with the communications network 5.

In this way, the second messaging application 18 may access the second server 21 to retrieve the second task data. In one example, the second messaging application 18 may send a request to the second server 21 to retrieve the second task data. The second messaging application 18 may send the request to retrieve the second task data as a result of a request from the second user 27 or another user of a messaging application.

Variations

As described above, FIG. 7 illustrates an example of the task 73 displayed on the display portion 71 on the second client device 7. The exemplary display portion 73 of FIG. 7 may also be displayed on the first client device 3.

In one example, based on sensing a mouse operation near the task 73 on the display portion 71 of the second client device 7, content 75 associated with the task 73 based on the second task data may be displayed. In a further example, the content 75 may comprise additional content such as notes, images, links or documents associated with the task. In yet a further example, the content 75 may comprise a calendar 78 that displays the date that the task is due. The calendar may also have selectable date fields 79 to allow the second user 27 associated with the second client device 7 to set a date that the task is due.

Figure 8:
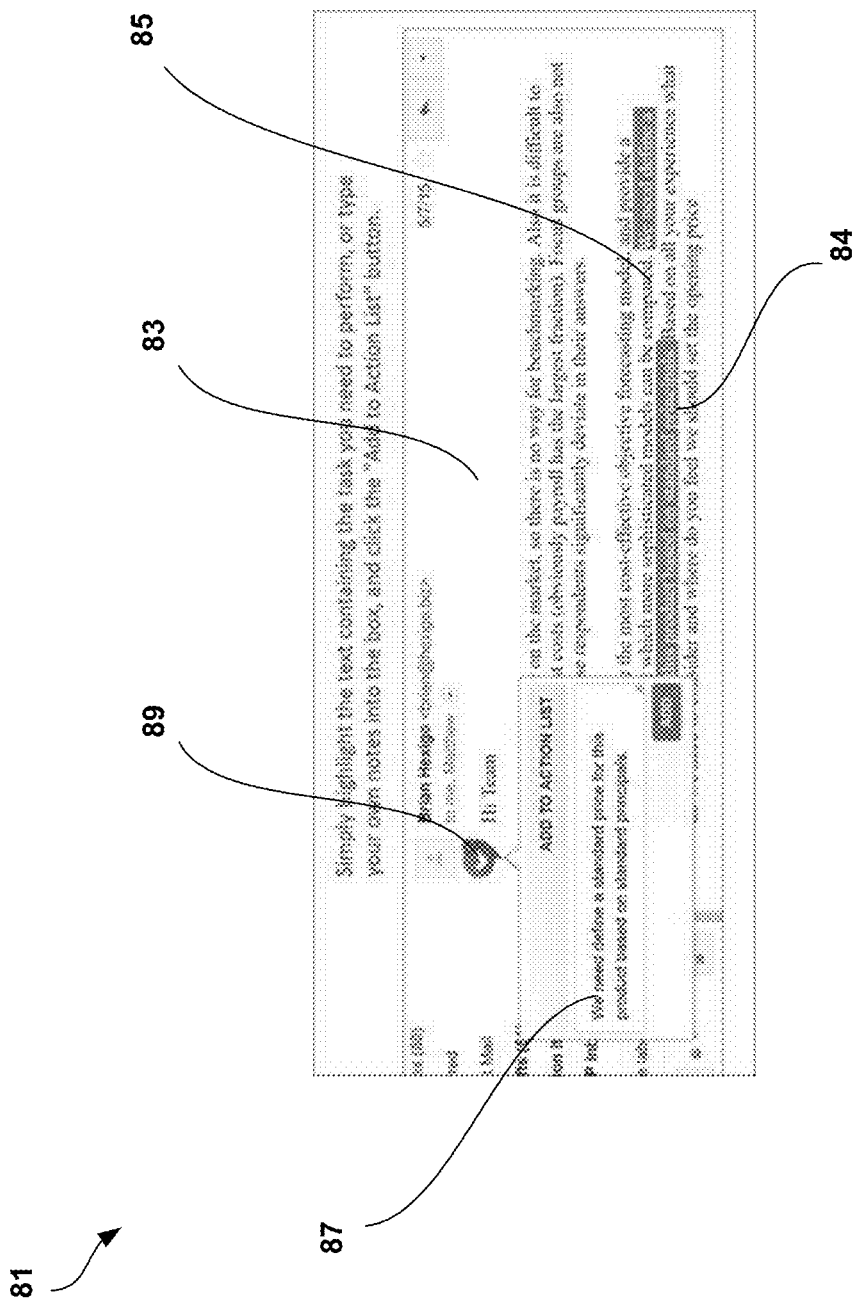
FIG. 8 illustrates an example of a message window provided by a messaging application.

FIG. 8 illustrates an example of a message window 81 provided by an email client that may be displayed on the first client device 3 or the second client device 7. The message window 81 comprises a message 83 with message content 85. In one example, the message content 85 may be selected to yield a selected content 84 and used to generate a dynamic or pop-up task window 87. In a further example, additional content such as notes, images, links or documents may be added to the task window 87. The content in the task window 87 may also be amended. A button 89 may be provided to allow additional task data to be generated based on the content of the task window 87. In this way, the first user 23 or second user 27 may select the button 89 to generate a task.

In a further example, a task based on the additional task data may be displayed by the user interface modules 143, 173 at the display portion on the first client device 3 or the second client device 7.

Software Plug-in to Messaging Applications

As described above, the messaging applications 14, 18 may be an instant messaging application or social media application. In this way, the software modules 141, 143, 145, 147, 171, 173, 175, 177 form part of first and second software plug-ins (i.e. a set of functionally additive code modules) to the messaging applications 14, 18. In other words, software modules 141, 143, 145, 147 form a first software plug-in and software modules 171, 173, 175, 177 form a second software plug-in. The software plug-ins may be acquired by and integrated into via the messaging applications 14, 18 by downloading or retrieving the software plug-ins from a data store or application download portal. In this way, the software modules 141, 143, 145, 147, 171, 173, 175, 177 may not be provided as native functionality within the messaging applications 14, 18.

The software modules 141, 143, 145, 147, 171, 173, 175, 177 of the software plug-ins may then perform the methods 100, 200 described above within the operating environment of the messaging application. This may mean that the software plug-ins need to access a central record system or other data store to perform steps of the method 100, 200 that are not otherwise performed on the native operating environment of the messaging application. For instance, if the messaging application 14, 18 does not comprise the functionality to parse 110 message content from an active input field 33, the parsing modules 141, 171 of the first and second software plug-ins may perform this functionality on the messaging application 14, 18.

In another example, plug-in code that is associated with the software modules of the plug-ins may be downloaded or retrieved by the messaging applications 14, 18 and subsequently executed and installed by the processing devices 13, 17 of the client devices 3, 7. Once the plug-in code has been executed and installed by the processing devices 13, 17, the messaging applications 14, 18 may exhibit the functionality of the software modules 141, 143, 145, 147, 171, 173, 175, 177. In one example, the messaging applications 14, 18 may each be issued in an original or updated version that includes the functionality of the software modules 141, 143, 145, 147 (for the first messaging application 14) or 171, 173, 175, 177 (for the second messaging application 18) of the software plug-in as native functionality. The updated version may be downloaded or retrieved from a data store or application download portal.

Processing Device

As described above, the first messaging application 14 and the second messaging application 18 may comprise at least one software module. The modules 141, 143, 145, 147, 171, 173, 175, 177 may comprise instructions that are executable by the first processing device 13 or the second processing device 17.

The software modules 141, 143, 145, 147, 171, 173, 175, 177 form processor-executable code components of the messaging applications 14, 18. In some embodiments, the software modules 141, 143, 145, 147, 171, 173, 175, 177 have native functionality within the messaging applications. In another example the software modules 141, 143, 145, 147, 171, 173, 175, 177 may form part of a plug-in to the messaging applications 14, 18. In this way, the software modules may be acquired by the messaging applications 14, 18 by downloading or retrieving from a data store or application download portal. After the software modules have been acquired by the messaging applications 14, 18 they may be integrated into the messaging applications 14, 18 by an installation and execution procedure.

The messaging applications 14, 18 rely on instructions stored in the memory of the client devices 3, 7. The instructions are executable by the processing devices 13, 17 of the client devices 3, 7.

As noted above, the first client device 3 and second client device 7 may be an electronic device, such as a computer, tablet computer, mobile communication device, computer server etc. The electronic device may include a processing device, a data store and a user interface.

Figure 9:
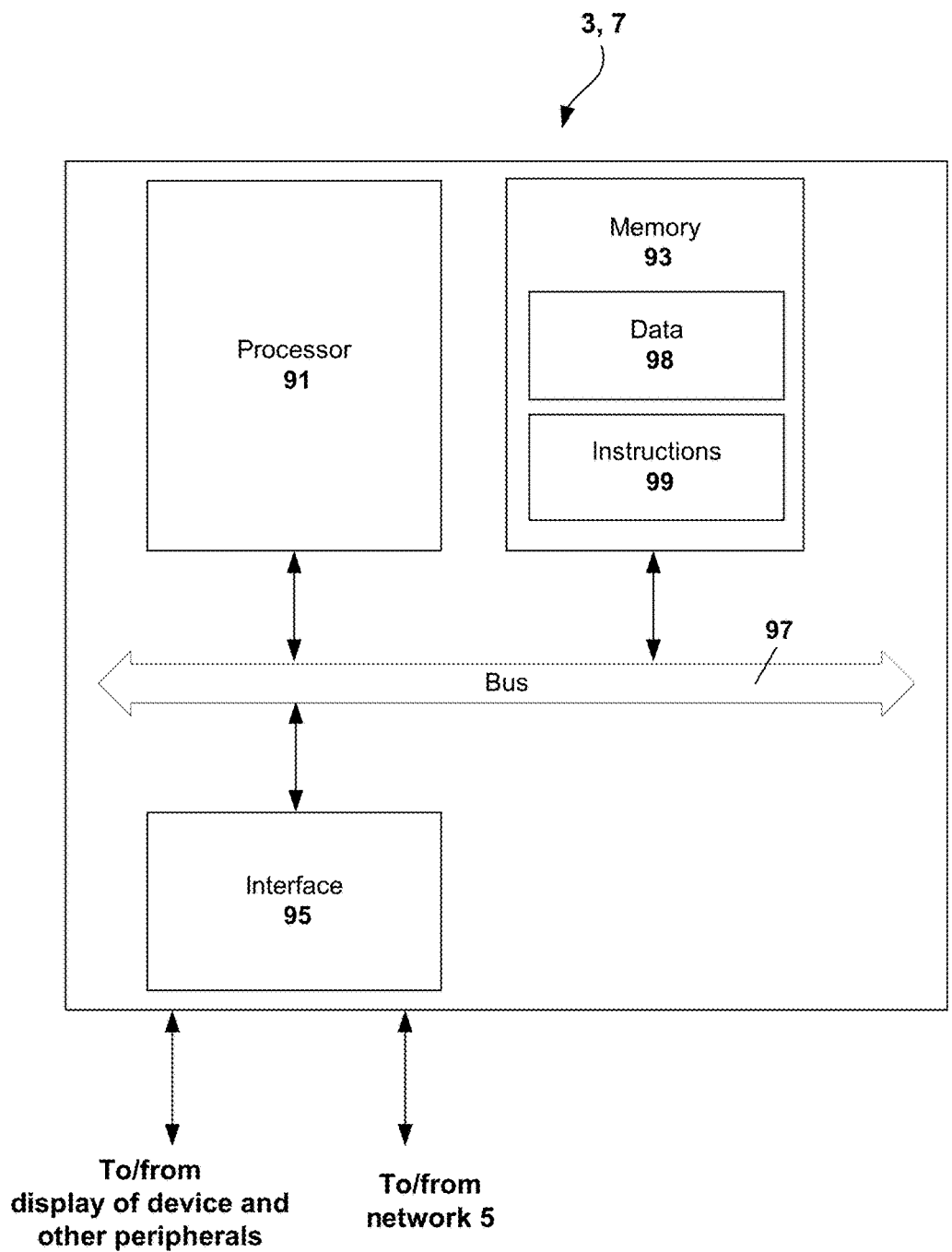
FIG. 9 illustrates a schematic of an example processing device.

FIG. 9 illustrates an example of a processing device. The processing device includes a processor 91, a memory 93 and an interface device 95 that communicate with each other via a bus 97. The memory 93 stores a computer software program comprising machine-readable instructions and data for implementing the method 100, 200 described above, and the processor 91 performs the instructions from the memory 93 to implement the method 100, 200. The memory 93 may further store the at least one software module of the first messaging application 14 and/or second messaging application 18 as described above. The interface device 95 may include a communications module that facilitates communication with the communications network 5, and in some examples, with peripherals such as a data store. It should be noted that although the processing device 91 may be an independent network element, the processing device 91 may also be part of another network element. Further, some functions performed by the processing device 91 may be distributed between multiple network elements. For example, the first client device 3 and/or second client device 7 may have multiple processing devices to perform either or both of methods 100, 200 in a secure local area network associated with the first client device 3 and/or second client device 7.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method of automatically generating a task on a first messaging application at a first client device associated with a first user and automatically storing the task on a second messaging application at a second client device associated with a second user, the method comprising:
   parsing, by a first client device, message content from an active field on the first messaging application of the first client device to identify at least one predefined character in the message content;
   receiving, in relation to the message content, a selection of a user name associated with a second user;
   automatically generating task metadata based on at least the first user, second user and a portion of the message content;
   attaching, by the first client device, the task metadata to the message content;
   sending, from the first client device to the second client device, a message comprising at least the message content;
   automatically generating, at the first client device, first task data based on the task metadata;
   receiving, at the second client device, the message comprising message content from the first client device;
   detecting, in relation to the message content, task metadata attached to the message content;
   identifying, by the second client device, second user data in the task metadata, wherein the second user data is associated with the second user;
   based on the identifying of the second user data, automatically generating second task data based on the task metadata; and
   storing, in relation to the second messaging application, the second task data at a location accessible by the second messaging application.

2. The method of claim 1, further comprising: displaying, at a display portion on the second client device, a task based on the second task data.

3. The method of claim 1, further comprising:
   storing, in relation to the first messaging application, the first task data at a location accessible by the first messaging application.

4. The method of claim 1, further comprising:
   displaying, at a display portion on the first client device, a task based on the first task data.

5. The method of claim 4, wherein based on sensing a mouse operation near the task on the display portion of the first client device, content associated with the task based on the first task data is displayed.

6. The method of claim 1, wherein the selection of the user name is based on a list of names.

7. The method of claim 1, wherein receiving the selection of the user name comprises the first user selecting the user name via the first client device.

8. The method of claim 1, wherein the message is an email.

9. The method of claim 8, wherein the task metadata is attached to a header of the email.

10. The method of claim 1, wherein the predefined character comprises "@".

11. A computer-implemented method of automatically storing a task on a second messaging application at a second client device associated with a second user, the method comprising:
   receiving, at the second client device, a message comprising message content from a first client device;
   detecting, in relation to the message content, task metadata attached to the message content;
   identifying, by the second client device, second user data in the task metadata, wherein the second user data is associated with the second user;
   based on the identifying of the second user data, automatically generating second task data based on the task metadata;
   storing, in relation to the second messaging application, the second task data at a location accessible by the second messaging application; and
   displaying, at a display portion on the second client device, a task based on the second task data,
   wherein based on sensing a mouse operation near the task on the display portion of the second client device, content associated with the task based on the second task data is displayed.

* * * * *